J. P. GROSET.
ICE CREAM CONE COOKING APPARATUS.
APPLICATION FILED NOV. 1, 1910.

1,010,619.

Patented Dec. 5, 1911.

2 SHEETS—SHEET 2.

WITNESSES:
H. Barnes
E. Peterson

INVENTOR:
John P. Groset
BY
Pierre Barnes
ATTORNEY

UNITED STATES PATENT OFFICE.

JOHN P. GROSET, OF BOTHELL, WASHINGTON.

ICE-CREAM-CONE-COOKING APPARATUS.

1,010,619.  Specification of Letters Patent.  Patented Dec. 5, 1911.

Application filed November 1, 1910. Serial No. 590,216.

*To all whom it may concern:*

Be it known that I, JOHN P. GROSET, a citizen of the United States, residing at Bothell, in the county of King and State of Washington, have invented certain new and useful Improvements in Ice-Cream-Cone-Cooking Apparatus, of which the following is a specification.

This invention relates to appliances for shaping and cooking conical food containers which are themselves composed of an edible material; and has for its object the improvement in such appliances.

The invention consists in devices which will successively serve to supply batter to a series of revoluble cooking vessels, then dispose the batter within the same to the requisite shapes, then subject the thus formed edible receptacles to a cooking heat, and finally discharge the finished articles from the cooking vessels, substantially as hereinafter described and claimed.

Figure 1:
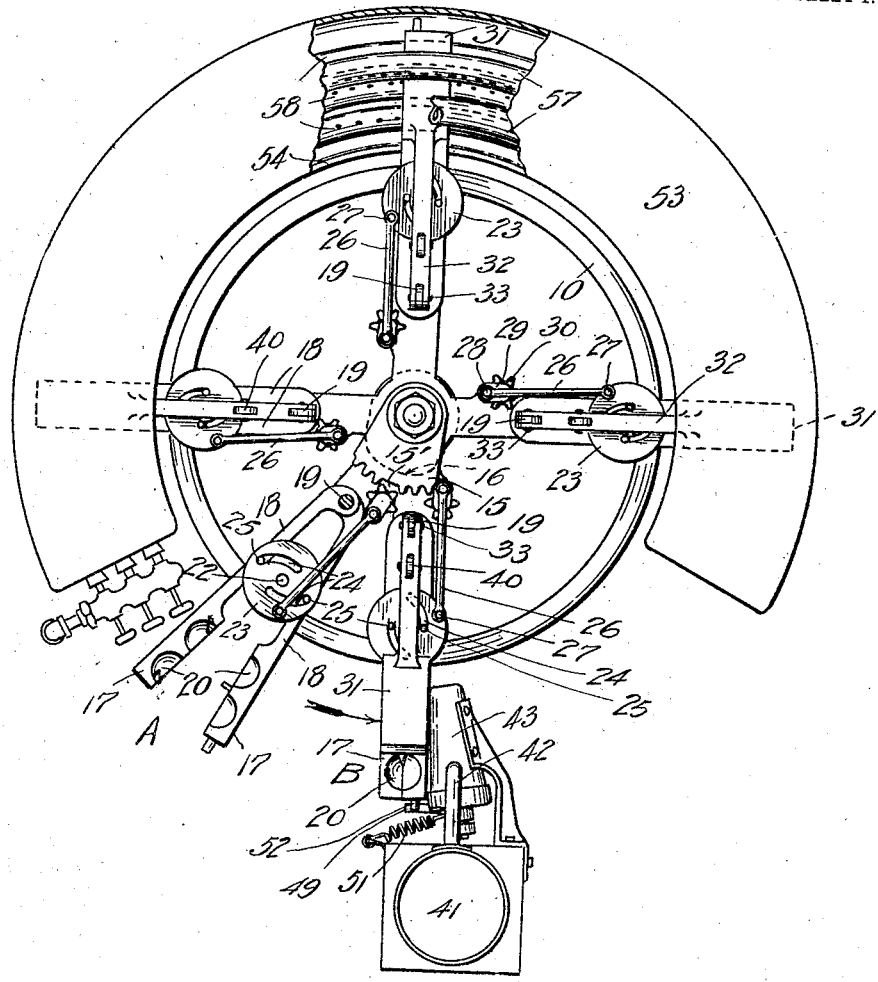
Figure 2:
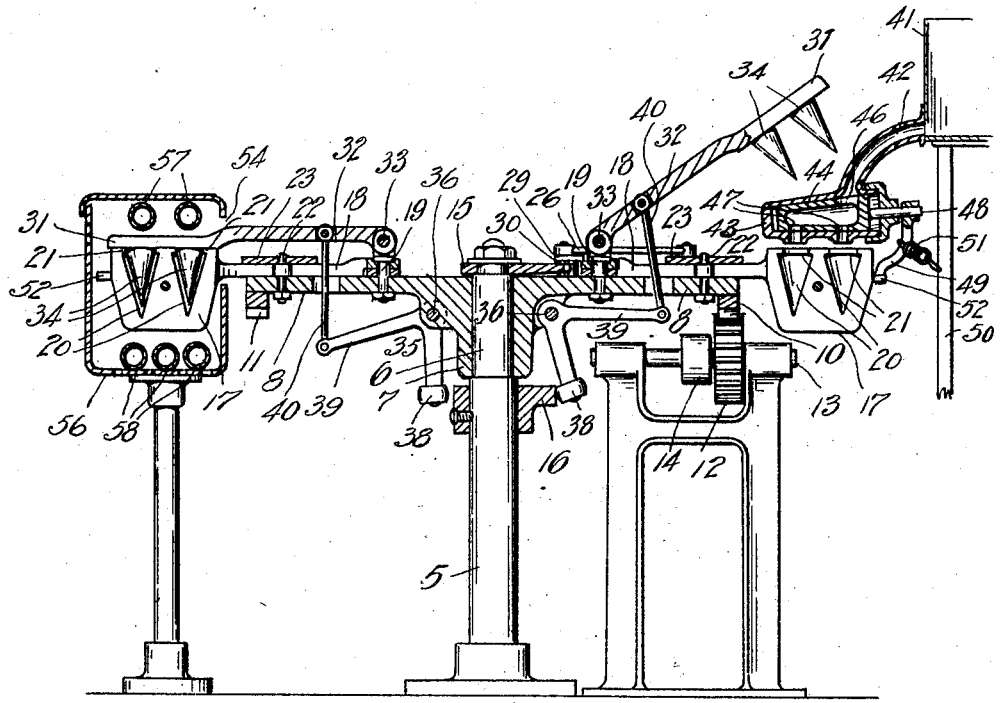

In the accompanying drawings, Figure 1 is a plan view of devices embodying my invention; and Fig. 2 is a transverse vertical section of the same.

In carrying out the invention, I employ an upright post 5 which is provided in proximity to its upper end with a journal 6 for the hub 7 of a carrier. This carrier is provided with a plurality of spokes 8 which are represented as integral with the hub, but they may as well be made separable from the hub. Fixedly secured to the underside of said spokes is a ring 10 arranged to be concentric to the carrier axis and is provided with gear teeth 11 at its underside. 12 represents a pinion in mesh with the teeth of the ring for imparting rotary motion to the carrier and the various elements which are carried thereby. The pinion 12 is mounted upon a shaft 13 which is rotated from a motor by suitable power transmission devices such as a belt passing about a pulley 14 provided on said shaft. In superposed relation to the carrier there is nonrotatably secured to the post 5 a toothed sector gear 15, and in like manner there is secured a cam element 16 below the carrier.

Supported and revolved with the several spokes 8 are corresponding associations of devices; but in order to more clearly explain the construction and functions thereof I will now describe one such assembly.

Carried upon and extending outside the extremity of a spoke 8 is a divided cooking vessel or mold comprising a pair of counterpart members 17 severally provided with rearwardly directed arms 18 which are hingedly connected to a vertical stud 19 which is fixedly secured to the spoke. Said mold is provided with recesses or pockets 30 of the shape of inverted cones and disposed so that their axes coincide with the divisional plane between the pair of mold parts when the same are in contact with each other. About the upper edge of the recesses they are provided with relatively narrow inwardly projecting peripheral flanges 21. Intermediate a mold and the pivotal studs 19 therefor, the arms 18 are spread apart to afford space to accommodate the shank of a pivot 22 secured to the spoke and extending above said arms. Rotatable upon the pivot is a disk 23 provided with cam slots 24 which receive pins 25 secured to the adjacent arms.

26 represents a rod operatively connecting a pin 27 carried by a disk with the pin 28 of a crank arm 29 which is fixedly secured to or formed with a toothed pinion 30 mounted for rotary motion upon the spoke.

The pinion 30 is provided with an equal number of teeth to that of the sector gear 15 and is located to be engageable by the latter during each rotation of the carrier and resulting in the complete rotation of the pinion while passing the toothed periphery of the sector gear. During such an occurrence, the disk 23 is actuated through the medium of the rod 26 to cause the cam slots 24 to primarily move the pins 25 asunder together with the separation of the mold parts to occupy the positions in which they are represented at A in Fig. 1, and ultimately restore the mold parts into their normal juxtaposed positions.

For coöperation with the molds there is provided a former member 31 having an arm 32 which is hingedly connected by a pin 33 to the upper end of the stud 19. Depending from this member are conical core elements 34 arranged to enter the mold pockets as clearly shown in the left side of Fig. 2. Said former member is operated to be elevated shortly before it is revolved into the position whereat the mold is opened. After a short interval subsequent to the closure of the mold the former is returned to its normal position with the cores thereof extending into the mold pockets. These actions of the former are accomplished through the instrumentality of the cam element 16 and a bell-crank 35 which is fulcrumed to a pin 36 supported by lugs provided on the carrier and below the spoke. One of the bell-crank arms is advantageously provided with a roller 38 to track against the cam while the other arm 39 of the bell crank is connected to the former arm by a lifting-rod 40.

Included in the invention are appliances for supplying batter to the molds consisting in a batter receptacle 41 located at a distance above the level of the molds and connected by a draw-off tube 42 therewith a casing 43 containing a valve 44 for regulating and delivering the charges of batter to the various mold pockets. Said casing is disposed to project into the space intermediate the mold and the former when such former is in the elevated position in which it is illustrated to the right of Fig. 2. Provided at the underside of this casing are spouts, one for each pocket of a mold. Said valve, as represented, (see Fig. 2) is in the form of a chambered plug which is fitted for axial rotary motion in the casing and is provided in its peripheral wall with an inlet opening 46 and outlet openings 47 which are respectively arranged to make communicative connection with the tube 42 and the casing spouts when the valve is actuated. To this end the valve is provided with a stem 48 having secured thereto a downwardly extending finger 49 wherefrom is connected with some fixed object, as the batter-receptacle, stand 50 for example, by a spring 51 which yieldingly retains the valve in a rotary position whereat the outlet openings 47 thereof will be out of register with the openings of said spouts. For opening the valve there is provided upon each mold a lug 52 arranged to successively encounter the valve controlling finger 49 and swerve the same in opposition to said spring in the passage of the respective molds thereby. Also included in the invention is an arcuate oven arranged concentric to the axis of the post 5. The oven is open at its ends for the entry and exit of the various molds and formers and in its inner circumferential wall is a slot 54 to accommodate the various arms 18 and 32 as the same travel therethrough.

The bottom wall 56 of the oven is desirably perforated for the admission of air for combustion purposes. Within the oven and adjacent to the top and bottom thereof, respectively, are pipe gas-burners 57 and 58. These gas-burners are constructed to direct the emitted flames from the upper ones downwardly against the formers, while the lower burners direct their flames upwardly against the molds.

The operation of the device is as follows: The carrier, as before explained, is rotated by power devices applied through the medium of the pinion 12 and the toothed ring 10 which is secured to the carrier spokes 8. Assuming that the former member 31 is raised through the offices of the cam 16 and the crank-lever 35 which is coupled with the member being considered and also that the associated mold members 17 are in close relation with each other, a condition prevailing as these elements are brought into the position B, Fig. 1. A progressive movement of these elements, in the direction of the arrow in the view, will cause the lug 52 to swerve the valve-finger 49 to open the valve 44 and deliver a quantity of batter from the receptacle 41 into the pockets 20 of the mold. The continued travel of the lug disengages the same from the finger, whereupon the spring 51 asserts itself to close the valve. The further movement of the carrier carries the bell-crank roller 38 beyond the effective part of the cam 16 resulting in the bell-crank withdrawing its support from the former member, whereupon this member is swung downwardly to obtrude the core elements into the mold pockets and causing the batter therein to flow into the spaces unoccupied by the core elements. A still further travel of the thus charged mold causes it to be transported through the oven and wherein the cooking of the batter into "cones" is effected. After leaving the oven, the cam 16 acts in conjunction to raise the former member to withdraw the core elements thereof from the previously cooked cones which are prevented from accompanying these elements by the interference of the flanges 21. When the cores have been withdrawn sufficiently to be free of the cones, the pinion 30 engages the gear 15 resulting in the cranks 29 becoming operative to cause the rod 26 to first turn the disk 23 in order to have the cam-slots 24 thereof act through the pins 25 and arms 18 to separate the mold parts 17, as represented at A in Fig. 1. The cones are now free to drop out upon a table or belt for example, which may be provided and wherefrom they may be removed by an attendant to be packed for delivery. Should a cone, however, stick to the walls of the mold the attendant would dislodge it by means of an instrument like a knife-blade. To such ends, it is desirable that the mold should be retained in an open state for an appreciable time and accordingly the teeth of the sector-gear 15 are grouped to afford an intermediate gap 15' (Fig. 1) wherein the pinion and the elements operatively connected therewith will be temporarily inactive. Continuing in its travel the rotation of the pinion 30 determines the closing of the mold parts and thus completes a cycle of operation.

It is to be understood that in practice a greater number of molds and coöperating parts will be utilized than is illustrated in the drawings.

What I claim as my invention, is—

1. An ice cream cone cooking apparatus comprising a rotatable carrier, operating means therefor, cone-shaped molds each formed of a pair of separable sections and supported and movable with said carrier, means pivotally connected to the carrier and engaging with the mold sections and adapted when actuated to open and close the molds, actuating means operated while the carrier is traveling for actuating said opening and closing means at pre-determined intervals, a cone-former member for each of said molds, each of said formers arranged over a pair of mold sections and to one side of the actuating means for the mold opener and closer, means for pivotally connecting the cone formers to the carrier, means for moving the cone formers to and from the respective molds at predetermined intervals, and means for supplying batter to said molds when the same are closed and while the cone formers are away from the molds.

2. An ice cream cone cooking apparatus comprising a rotatable carrier, operating means therefor, cone-shaped molds each formed of a pair of separable sections and supported and movable with said carrier, means pivotally connected to the carrier and engaging with the mold sections and adapted when actuated to open and close the molds, actuating means operated while the carrier is traveling for actuating said opening and closing means at pre-determined intervals, a cone-former member for each of said molds, each of said formers arranged over a pair of mold sections and to one side of the actuating means for the mold opener and closer, means for pivotally connecting the cone formers to the carrier, means for moving the cone formers to and from the respective molds at predetermined intervals, means for supplying batter to said molds when the same are closed and while the cone formers are away from the molds, and a concentric oven partially surrounding the carrier and through which the molds with the formers therein travel whereby the cones are cooked.

3. An ice cream cone cooking apparatus comprising a rotatable carrier, operating means therefor, cone-shaped molds each formed of a pair of separable sections and supported and movable with said carrier, means pivotally connected to the carrier and engaging with the mold sections and adapted when actuated to open and close the molds, actuating means operated while the carrier is traveling for actuating said opening and closing means at pre-determined intervals, a cone-former member for each of said molds, each of said formers arranged over a pair of mold sections and to one side of the actuating means for the mold opener and closer, means for pivotally connecting the cone formers to the carrier, means for elevating the cone formers out of the molds and lowering them into the molds at pre-determined intervals, and means for supplying batter to said molds when the same are closed and while the cone formers are away from the molds.

4. An ice cream cone cooking apparatus comprising a rotatable carrier, operating means therefor, cone-shaped molds each formed of separable sections supported on and movable with the carrier, a toothed segment traveling with the carrier, means pivotally connected to the carrier and engaging with the mold sections for opening and closing the molds, means operated by said segment for actuating said opening and closing means to open and close the molds at pre-determined intervals during the travel of the carrier, a cone former member for each of said molds, means for pivotally connecting the cone former members to the carrier, said members traveling with the carriers, bell cranks pivotally suspended from the carrier, means connected to one arm of the bell cranks and with said members for elevating and lowering them at pre-determined intervals during the travel of the carrier, means whereby the bell cranks are actuated during the travel of the carrier, and means for supplying batter to said molds when they are closed and when the former members are elevated from the mold.

5. An ice cream cone cooking apparatus comprising a rotatable carrier, operating means therefor, cone-shaped molds each formed of separable sections supported on and movable with the carrier, a toothed segment traveling with the carrier, means pivotally connected to the carrier and engaging with the mold sections for opening and closing the molds, means operated by said segment for actuating said opening and closing means to open and close the molds at predetermined intervals during the travel of the carrier, a cone former member for each of said molds, means for pivotally connecting the cone members to the carrier, said members traveling with the carriers, bell cranks pivotally suspended from the carrier, means connected to one arm of the bell cranks and with said members for elevating and lowering them at pre-determined intervals during the travel of the carrier, means whereby the bell cranks are actuated during the travel of the carrier, means for supplying batter to said molds when they are closed and when the former members are elevated from the mold, and a concentric oven partially surrounding the carrier and through which the molds with the former members therein are adapted to travel whereby the batter is cooked.

6. An ice cream cone cooking apparatus comprising a rotatable carrier, operating means therefor, molds supported on said carrier, each of said molds being formed of a pair of hinged sections, a shiftable slotted plate mounted upon each pair of mold sections, connections between the plate and said sections whereby when the plate is shifted in one direction, the molds will be thrown open and in the other direction the molds will be closed, means connected with said plate and operated by the movement of the carrier for shifting said plate at pre-determined intervals, cone-former members pivotally connected at one end to and movable with the carrier and capable of being shifted into the molds and elevated from the molds during the travel of the carrier, mechanism including bell crank levers connected with said members and operated during the travel of the carrier for elevating and lowering said members, and means for supplying batter to the molds, and a concentric oven partly surrounding the carrier and through which the molds with the formers are adapted to travel to cook the batter to form the cones.

JOHN P. GROSET.

Witnesses:
H. BARNES,
E. PETERSON.